(12) United States Patent
Flinchem

(10) Patent No.: US 9,569,772 B2
(45) Date of Patent: Feb. 14, 2017

(54) ENHANCING BANK CARD SECURITY WITH A MOBILE DEVICE

(75) Inventor: Edward Flinchem, Seattle, WA (US)

(73) Assignee: Patent Navigation Inc, Seattle, WA (US)

( * ) Notice: Subject to any disclaimer, the term of this patent is extended or adjusted under 35 U.S.C. 154(b) by 2098 days.

(21) Appl. No.: 11/642,326

(22) Filed: Dec. 20, 2006

(65) Prior Publication Data

US 2007/0138261 A1  Jun. 21, 2007

Related U.S. Application Data

(60) Provisional application No. 60/752,419, filed on Dec. 21, 2005.

(51) Int. Cl.
  G06Q 20/38 (2012.01)
  G06Q 20/12 (2012.01)
  G06Q 20/32 (2012.01)
  G06Q 20/40 (2012.01)

(52) U.S. Cl.
  CPC .......... *G06Q 20/3821* (2013.01); *G06Q 20/12* (2013.01); *G06Q 20/32* (2013.01); *G06Q 20/385* (2013.01); *G06Q 20/40* (2013.01)

(58) Field of Classification Search
  CPC ................................................ G06Q 20/3821
  USPC ................... 705/75, 76, 77, 78, 79
  See application file for complete search history.

(56) References Cited

U.S. PATENT DOCUMENTS

| | | | |
|---|---|---|---|
| 6,338,140 B1 * | 1/2002 | Owens .................. | H04W 12/06 380/255 |
| RE39,736 E * | 7/2007 | Morrill, Jr. ..................... | 705/44 |
| 7,448,538 B2 * | 11/2008 | Fletcher ................. | G06Q 20/12 235/379 |
| 7,472,827 B2 * | 1/2009 | Fletcher ................. | G06Q 20/12 235/379 |
| 2001/0043599 A1 * | 11/2001 | Redmond ............ | G06Q 10/107 370/390 |
| 2002/0059146 A1 * | 5/2002 | Keech ..................... | G06Q 20/02 705/64 |
| 2006/0136334 A1 * | 6/2006 | Atkinson ............. | G06Q 10/087 705/40 |
| 2011/0078031 A1 * | 3/2011 | Mardikar ............... | G06Q 20/20 705/17 |

* cited by examiner

*Primary Examiner* — Calvin L Hewitt, II
*Assistant Examiner* — Cristina Sherr
(74) *Attorney, Agent, or Firm* — FSP LLC

(57) ABSTRACT

A PIN server system interacts with one or more financial institutions to authenticate a mobile phone and-or a user thereof. The PIN server provides to the mobile phone one or more PIN numbers to use in financial transactions involving the one or more financial institutions, and also provides the one or more PIN numbers to the financial institutions in a manner that results in the one or more PIN numbers being associated with one or more accounts of the mobile phone user with the one or more financial institutions.

7 Claims, 3 Drawing Sheets

ENHANCING BANK CARD SECURITY WITH A MOBILE DEVICE

PRIORITY CLAIM

This application claims priority as a utility patent application corresponding to subject matter of U.S. provisional application 60/752,419, which is hereby incorporated by reference in its entirety.

BACKGROUND

Bank cards are convenient mechanisms for accessing and transferring funds. This very convenience has opened doors to fraud and theft of funds, using bank cards and/or bank card codes.

One manner of protecting bank card transactions is through the use of authorization codes, also known as PIN codes. One problem with PIN codes is that they are static (difficult to change) and hence tend to be used over and over again over many transactions. As a result, PIN codes are subject to being discovered by others, compromising the security of the funds available via the bank card.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A PIN server system interacts with one or more financial institutions to authenticate a mobile phone and-or a user thereof. The PIN server provides to the mobile phone one or more PIN numbers to use in financial transactions involving the one or more financial institutions, and also provides the one or more PIN numbers to the financial institutions in a manner that results in the one or more PIN numbers being associated with one or more accounts of the mobile phone user with the one or more financial institutions.

BRIEF DESCRIPTIONS OF THE DRAWINGS

DESCRIPTION

Figure 1:
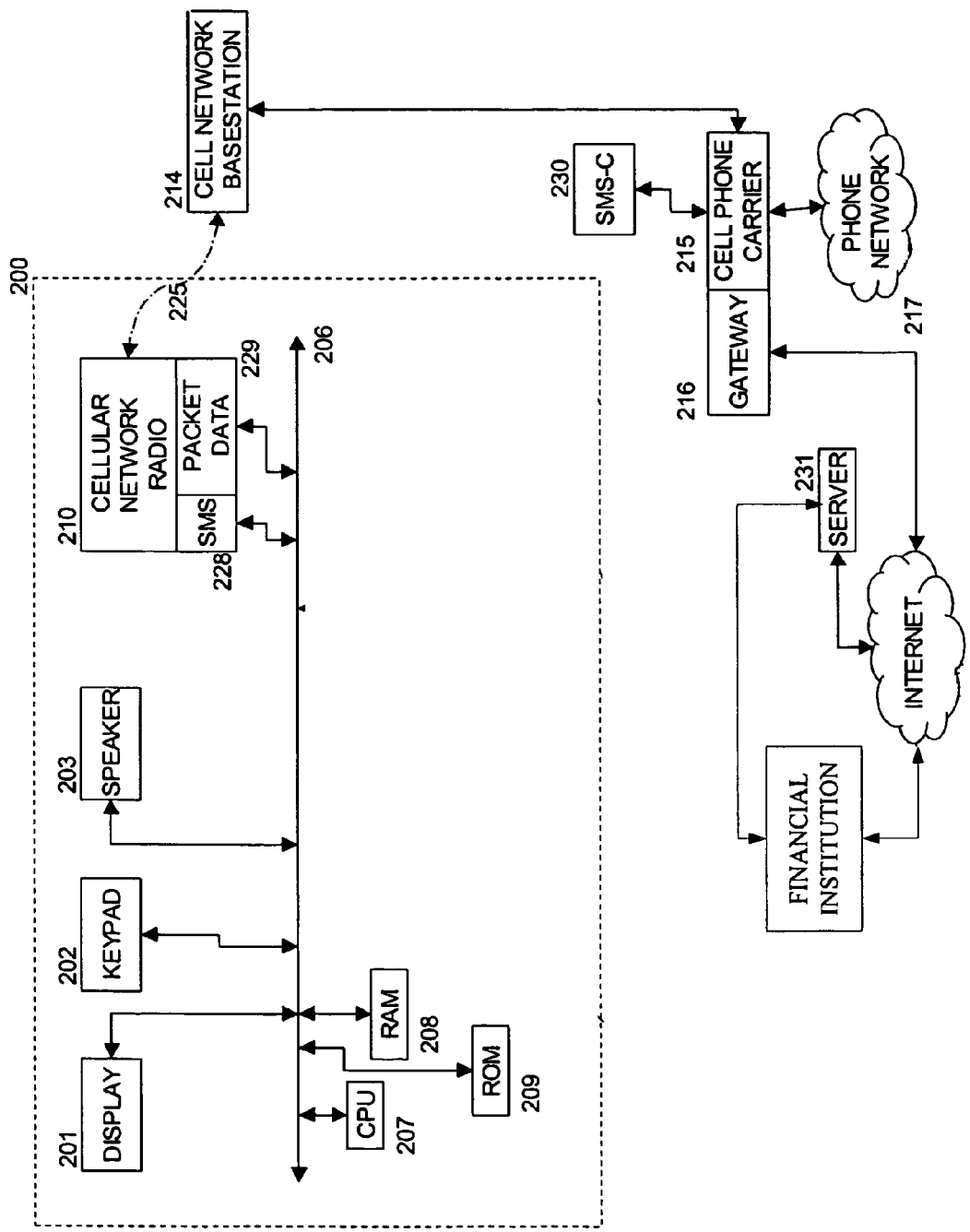
FIG. 1 is a block diagram of an embodiment of a mobile device interacting with a PIN server.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware. Those skilled in the art will appreciate that logic to carry out particular techniques described herein may be dispersed throughout one or more devices, and thus may not lend itself to discrete illustration in the drawings, but may nonetheless be considered as elements of the one or more devices. For example, a mobile phone may comprise logic to carry out acts described herein, as may a PIN server and devices (such as computers) controlled by financial institutions.

FIG. 1 illustrates an embodiment of a mobile phone 200. Information is presented on the screen 201 and through the speaker(s) 203. A data bus 206 communicatively couples various elements within the phone. The mobile phone embodiment 200 also comprises processor 207 and random access memory 208 and persistent memory 209 (which could be re-writeable FLASH memory).

The phone 200 comprises a radio 210 to communicate via a medium range (up to many kilometers) microwave link 225 with cellular wireless voice and data network base stations 214 through their associated mobile phone carrier 215 and onward, either though a phone network 217 or through a gateway 216 to a public or private data network 218 such as the Internet. The radio 210 can send and receive both Short Message Service (SMS) messages 228 through the phone network(s) 215 217 to other phones identified by their phone numbers and send and receive a variety of data 229 protocols (UDP, TCP, SMTP, HTTP, etc) through the data network 218.

In data communication with the data network 218 is a server complex 231 that enables a download of executable code and data files to the phone 200. In data communication with the server complex 231 is a financial institution 232, communicating either directly or via the network 218.

Figure 2:
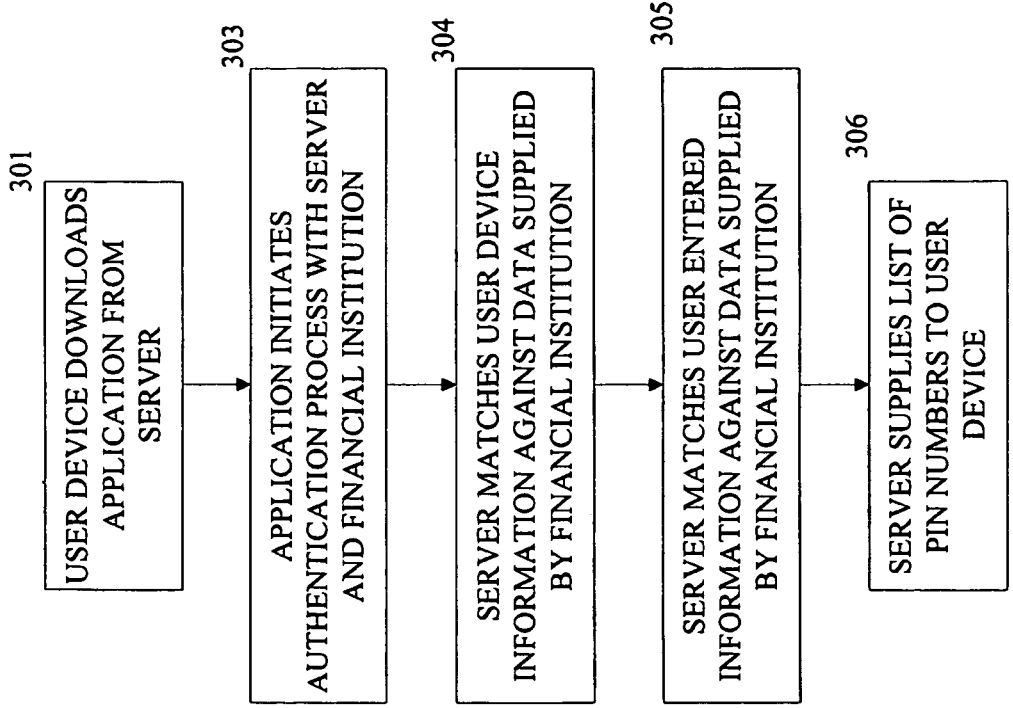
FIG. 2 is a flow chart of an embodiment of a process of a mobile device obtaining PIN numbers from a PIN server.

FIG. 2 illustrates an embodiment of an initiation process between a user device and a financial institution. A user device downloads an application from a server at block 301. The server may be, for example, a PIN server that provides one or more PIN numbers to the device. At a block 303, the downloaded application initiates an authentication process with the server and the financial institution. This authentication process serves to authenticate (e.g. verify the identity of) the device and/or the user of the device with the server and the financial institution. The financial institution may access an account corresponding to the device-supplied information. At a block 304, the server matches user device information (such as the device's phone number, unique hardware code, or unique user code such as may be obtained from a Subscriber Identity Module) against data supplied by the financial institution. At a block 305, the server matches user entered information against data supplied by the financial institution, e.g. a password corresponding to the user's account. For example, in addition to verifying the user's phone number, device id, or SIM id, the server may also perform a challenge/response authentication process with the device, such as requiring a password. At a block 305, the server supplies list of personal identification numbers (PINs) to the user device (block 306) and to the financial institution. The list may comprise a single PIN or multiple PINs.

The PINs may be generated dynamically by the server, or they may be obtained from a PIN "pool". The PINs may be limited in use to a single transaction, a number of transactions, or may be limited to use for an interval of time.

Figure 3:
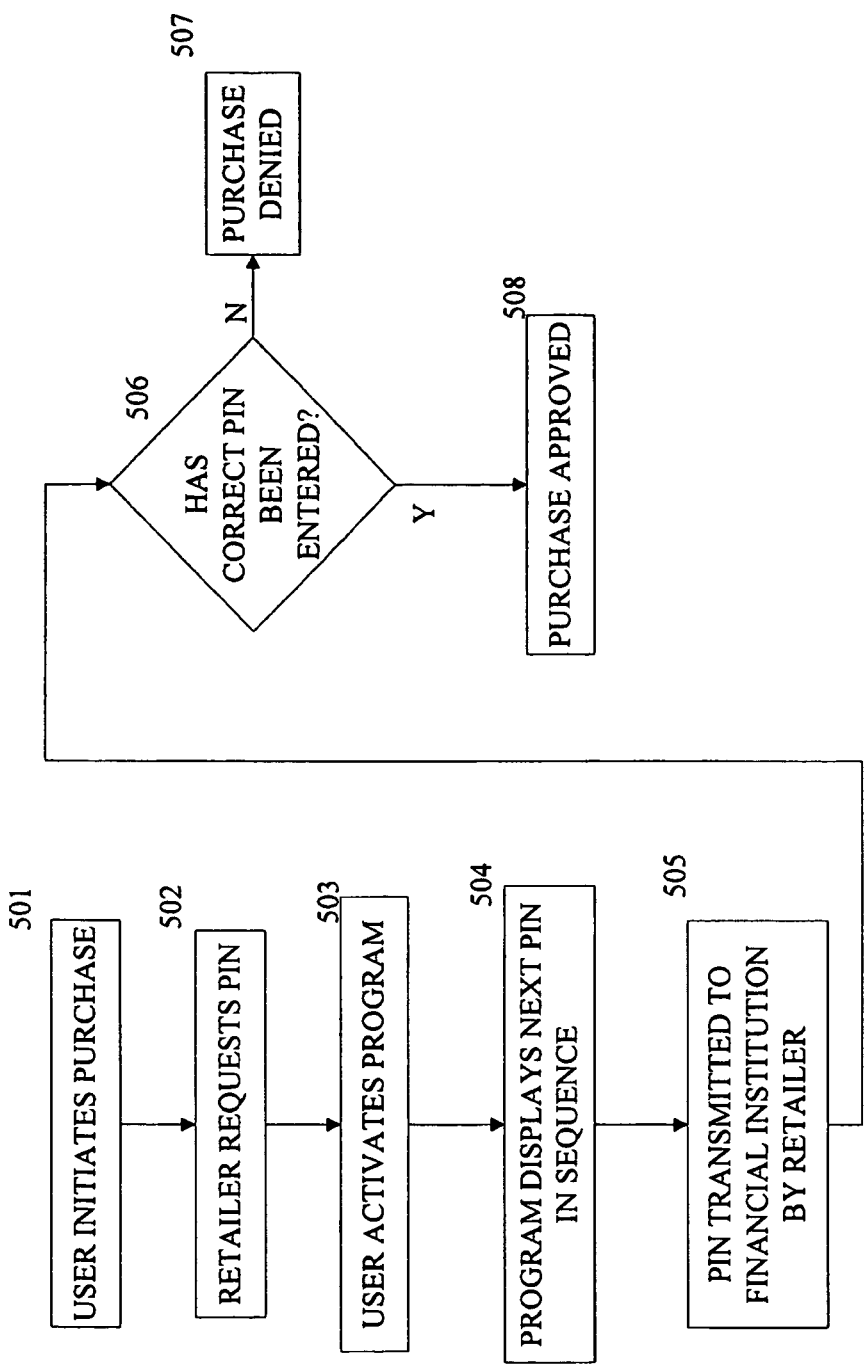
FIG. 3 is a flow chart of an embodiment of a process of a mobile device providing PIN numbers at a point of sale.

FIG. 3 illustrates an embodiment of a point of purchase transaction performed after the authentication performed in FIG. 2. At a block 501, the user initiates a purchase of a product at a retailer device. At a block 502, the retailer device requests that the provider of a bank card provide a PIN. At a block 503, the user activates an application on the user's mobile device that displays a PIN to use for this transaction. The PIN could be generated dynamically by the PIN server and provided to the device, or it may be one or one or more PINs previously generated by the PIN server and stored by the device. For example, the PIN could be one of the list of pins that were supplied at block 305 of FIG. 2 (see block 504). The user provides the displayed PIN at the retailer device. At a block 505, the retailer device transmits the entered PIN to the financial institution at a block 505. The financial institution determines if the correct PIN has been entered at a block 506. If the financial institution determines that the correct PIN has not been entered, the transaction is denied (block 507) and the denial is reported to the retailer. If the financial institution determines that the correct PIN has been entered, the transaction is approved (block 507) and the approval is reported to the retailer for completion of the transaction.

The transaction need not even involve a bank card, in some instances. Rather, a PIN supplied to the mobile device, along with identification of the corresponding bank account, may provide sufficient authentication for purposes of the transaction, without requiring the user to supply a bank card. In other instances, the mobile device may communicate account information of the user to the point of sale equipment (e.g. via short-range wireless technology such as Bluetooth).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention may be delimited by reference to the claims that follow.

What is claimed is:

1. A method comprising:

a wireless mobile device exchanging signals with a PIN server device to verify therewith an identity of the wireless mobile device or an identity of a user of the wireless mobile device;

the wireless mobile device exchanging signals with computing devices of a financial institution to verify therewith an identity of the user of the wireless mobile device;

the devices of the financial institution and the PIN server exchanging signals to verify that the mobile device is associated with the user; and the PIN server communicating one or more PINs to the wireless mobile device via signals that pass at least partially via wireless electromagnetic channels.

2. The method of claim 1, further comprising:

a retail device scanning bank card information of the user; the user and/or mobile device communicating to the retail device one of the pins communicated from the PIN server to the mobile device; the retail device transmitting electromagnetic signals representing the provided PIN to equipment of the financial institution; the financial institution verifying the PIN and communicating electromagnetic signals to the retailer device to approve the transaction.

3. The method of claim 2, further comprising the PIN provided to the retail device for the transaction becoming invalid upon completion of the transaction.

4. The method of claim 2, further comprising the PIN provided by the PIN server to the mobile device becoming invalid after the lapse of an interval of time.

5. The method of claim 2, further comprising the PIN communicated from the PIN server to the mobile device becoming invalid after being used in limited number of transactions.

6. The method of claim 1, further comprising the mobile device communicating to the PIN server via electromagnetic signals an identification comprising one or more of (a) a phone number, (b) unique hardware code, or (c) a user code from a Subscriber Identity Module; the PIN server comparing the received identification with an identification received from the financial institution; the PIN server communicating electromagnetic signals comprising the one or more PINs to the mobile device if the identification received from the financial institution matches the identification received from the mobile device and further if the user passes authentication with the PIN server.

7. The method of claim 1, further comprising the mobile device communicating electromagnetic signals comprising account information and a PIN number of the one or more PINs to the retail device.

* * * * *